United States Patent [19]

Sibley

[11] 4,307,463

[45] Dec. 22, 1981

[54] VITAL RATE DECODER

[75] Inventor: Henry C. Sibley, Adams Basin, N.Y.

[73] Assignee: General Signal Corporation, Rochester, N.Y.

[21] Appl. No.: 119,655

[22] Filed: Feb. 8, 1980

[51] Int. Cl.[3] ........................ G06F 11/00; B61L 27/00

[52] U.S. Cl. .......................................... 371/14; 246/5; 246/28 F; 371/69

[58] Field of Search ........................ 371/14, 53, 57, 69; 340/507, 508; 246/3, 4, 5, 28 F

[56] References Cited

U.S. PATENT DOCUMENTS

| | | | |
|---|---|---|---|
| 4,090,173 | 5/1978 | Sibley | 371/70 |
| 4,133,504 | 1/1979 | Dobler et al. | 371/69 |
| 4,181,849 | 1/1980 | Sibley | 235/92 T |

*Primary Examiner*—Charles E. Atkinson
*Attorney, Agent, or Firm*—Oblon, Fisher, Spivak, McClelland & Maier

[57] ABSTRACT

A vital rate decoder for actuating one of a plurality of output relays in correspondence with the frequency of an input signal applied thereto, comprising a main rate decoding processor for evaluating the frequency and duty cycle of the input signal by establishing permissible rate windows defined by predetermined tolerances such that the output device corresponding to a frequency can be actuated only when the input signal has a rate code falling in a respective rate window with a predetermined duty cycle tolerance. The rate decoding processor produces plural checkwords having predetermined values based on failure-free rate decoding of the input signal. The checkwords are processed by a checking processor which produces a relay actuating signal only if valid checkwords are produced. The checking processor uses the checkwords to select and load predetermined bytes into a pair of vital counting registers which are then successively decremented. The checking processor then compares the decremented counter register contents at each step to verify that the contents thereof bear a predetermined relationship such that the output device corresponding to the rate code of the input signal is actuated only until the counting registers reach a predetermined count and only so long as the comparison of the contents of the pair of counting registers bear the predetermined relationship.

18 Claims, 7 Drawing Figures

VITAL RATE DECODER

BACKGROUND OF THE INVENTION

1. Field of the Invention

The present invention relates to a vital rate decoder for actuating any one of a plurality of output relays in correspondence with the frequency or rate code of an input signal applied to the decoder, which input signal may be generated, for example, by my "Vital Electronic Code Generator" as disclosed in my co-pending U.S. application Ser. No. 002,765 filed Jan. 11, 1979, the disclosure of which is hereby incorporated by reference.

Also, the present invention more generally relates to the technology disclosed in my prior U.S. Pat. Nos. 4,090,173 and 3,995,173, and my prior U.S. patent application Ser. No. 873,574 filed Jan. 30, 1978, now U.S. Pat. No. 4,181,849, and Ser. No. 002,765 filed Jan. 11, 1979, the disclosure of each of which is incorporated by reference herein.

2. Description of the Prior Art

In a number of industrial applications, such as railroad technology, code generators are commonly used to transfer information. In the railway signaling and control field, for example, vehicle speed, application of motor and braking power, indicator lights aboard the vehicle, and other functions may be controlled automatically or manually in response to coded information transmitted from wayside stations via the rails. This coded information normally takes the form of low frequency pulses having frequencies corresponding to the particular control functions which are applied by a code generator to the vehicle rails in the form of variable low frequency pulse rates, which are then detected by a decoder at another station programmed to detect the frequency, and operate relays in conjunction with the frequency of the detected incoming pulse train.

Since human lives often depend upon safe operation of the vehicle and which in turn depends upon reliable, accurate detection of the pulse rate signals applied to the vehicle rails, railway control systems are typically required to exhibit fail-safe or "vital" qualities. To that end, modern rail transit systems employ cycle checking and diversity safety design techniques to protect against unsafe conditions. Cycle checking involves a continuous testing of a device, circuit or computer instruction to ensure that it is completely functional. Diversity, on the other hand, involves the use of two or more independent channels to produce a permissive output, in which the channels are selected so that a single disruptive event cannot cause identical failures in all of the channels, and all of the channels must agree before permissive output is accepted. These safety design techniques are directed to the promotion of a fail-safe or "vital" operation, in which any failures which occur tend to result in a condition which is no more dangerous (or conversely at least as safe) as if an equipment failure has not occurred.

In the past, the task of decoding the various pulse rates, typically on the order of 75, 120 or 180 pulses per minute, applied to the rails has been performed by passive LC filter circuits, each tuned to a particular pulse repetition rate, and each formed of very large inductor and capacitor components. Thus, at least one tuned circuit for each pulse rate has been required. However, because of the low frequencies involved, massive inductors and capacitors, which are expensive, extremely heavy, bulky, and take up considerable space, have been employed. Thus, although the previously used passive circuits are generally reliable in that the tuned frequency of such a passive circuit is not easily subject to change, nevertheless the obvious disadvantages associated therewith have resulted in efforts to produce lighter, smaller, less expensive, and equally reliable alternatives. One alternative employed involves modern active filtering techniques, typically using an operational amplifier and associated resistors and capacitors arranged in a feedback circuit resulting in a filter tuned to the particular frequency. While active filters of this type are considerably smaller and less expensive, they achieve these improvements at the expense of reliability, and more particularly at the expense of the assurance of failure-free performance, in view of the higher likelihood of a failure in an active filter circuit and in view of the difficulty in implementing cycle checking and diversity features in these types of circuits.

SUMMARY OF THE INVENTION

Accordingly, it is one object of the present invention to provide a new and improved vital rate decoder which is smaller, lighter, less expensive, and capable of decoding any one of a number of different incoming rate codes.

Another object of the present invention is the provision of a novel vital rate decoder which is rendered fail-safe by a plurality of self-checking features.

A still further object of the present invention is to provide a novel microprocessor based vital rate decoder which includes both diversity and cycle checking features to prevent the erroneous detection or identification of rate codes.

A still further object of the present invention is to provide a novel technique for producing a fully vital electronic rate decoder.

Yet another object of this invention is to provide a novel vital rate decoder which includes both unique programming functions and hardware circuit components which are checked against one another to ensure against code rate errors.

Yet another object of this invention is to provide a novel vital rate decoder formed by a decoder microprocessor and a vital checking microprocessor which operate in tandem respectively to evaluate and identify the rate code of an incoming signal and to apply an output activation signal to a corresponding output relay for a predetermined time period corresponding to a selected number of cycles of the incoming rate code.

A further object of this invention is to provide a novel vital rate decoder capable of decoding any one of a number of different incoming rate codes.

These and other objects are achieved according to the invention by providing a novel rate decoder for actuating one of a plurality of output relays in correspondente with the frequency or rate code of an input signal applied to the decoder, including a decoder processor coupled to the input signal for evaluating the rate code and duty cycle of the input signal. According to the invention, the decoder processor establishes permissible rate windows defined by predetermined tolerances such that the output relay corresponding to a rate code can be actuated only when the output signal has a rate code falling within a respective rate window with a predetermined duty cycle tolerance. For that purpose, the decoder processor produces plural checkwords indicative of decoder operation with each of the checkwords having predetermined values based on failure free decoding of the input signal and wherein new checkwords for at least each cycle of the input signal are generated to replace the checkwords generated for the previous cycle of the input signal.

The vital rate decoder further includes a checking processor operating in conjunction with the decoding processor and coupled thereto for receiving the checkwords from the decoding processor. The checking processor includes a microprocessor having a pair of vital counting registers and a memory containing a vital output program for actuating an output relay corresponding to the rate code of the input signal wherein the checkwords are used in the loading of predetermined bytes into the vital counting registers and decrementing thereof under the control of the output program, the program entering an idle state if an invalid checkword is generated. The contents of the vital counting registers are then compared and it is verified that the contents of the pair of registers bear a predetermined correspondence such that the output device corresponding to the rate code of the input signal is actuated only until the counting registers reach a predetermined count and only so long as the comparison of the contents of the pair of counting registers bears a predetermined relationship.

The decoding processor of the vital rate decoder of the invention is coupled to a vital output port having plural output bits, each of which is coupled to a respective output relay, with the decoding processor applying a VITAL− polarity signal to the output relay corresponding to the rate code of the input signal. On the other hand, the vital output program in the memory of the checking microprocessor periodically sets and resets a flip-flop during the decrementing of the vital counting registers to produce an output signal having a predetermined frequency. The checking processor vital output signal is applied to a tuned vital driver which is tuned to the output frequency produced by the checking processor and produces a VITAL+ signal for application to one side of each of the output relays upon successful processing of the checkwords, the other side of each of the output relays being connected to respective bits of the output port of the vital port.

Typically, the checking routines of the decoder of the invention verify failure free output port operation, decoding processor and checking processor clocking, output data generation, and checkword generation, utilization and regeneration.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
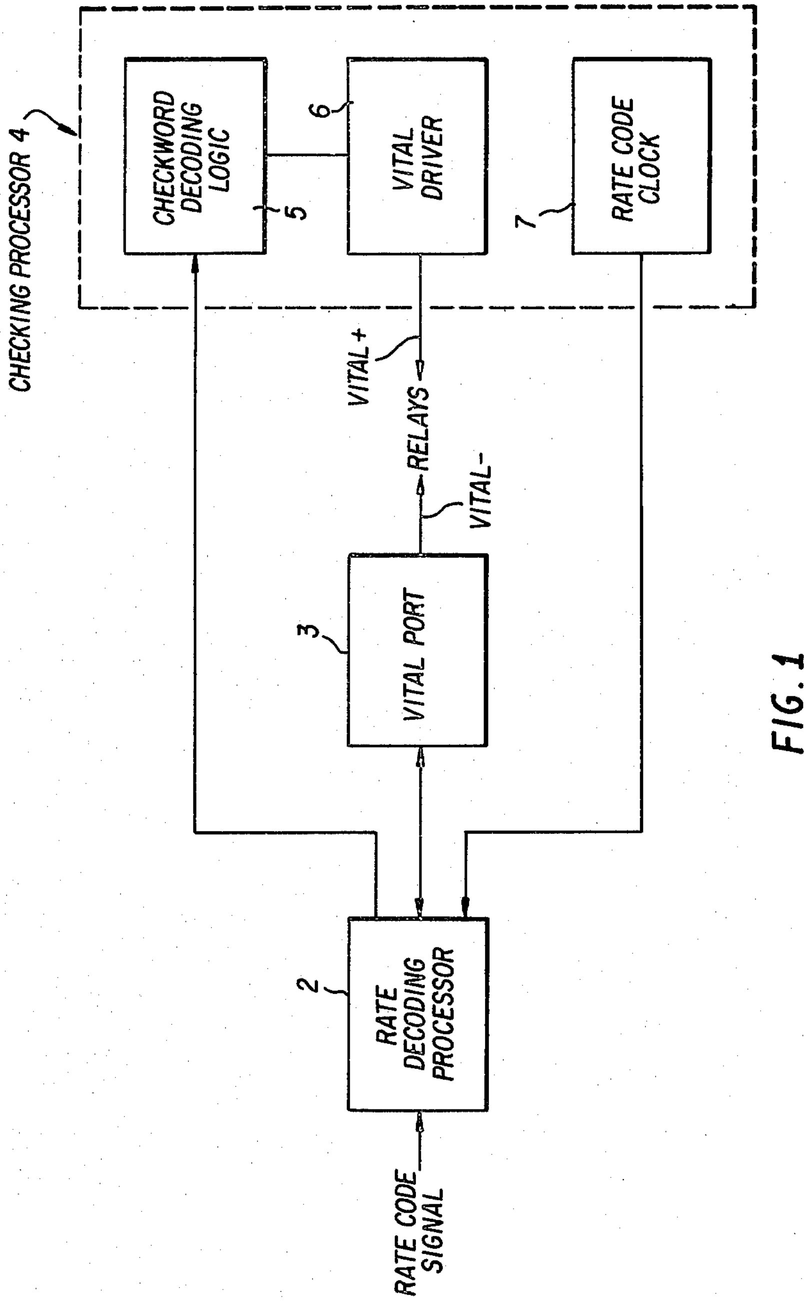
FIG. 1 is a block diagram of the vital rate decoder of the invention.

Referring now to the drawings, wherein like reference numerals designate identical or corresponding parts throughout the several views, and more particularly to FIG. 1 thereof, the vital rate decoder of the invention is seen to include a decoding processor 2 coupled to a vital port 3, and a checking processor 4. Checking processor 4 includes checkword decoding logic 5 coupled at an input thereof to the decoding processor 2 and at an output thereof to a vital driver 6, and also a rate code clock 7 for applying a clock signal to the decoding processor 2.

Decoding processor 2 evaluates the frequency and duty cycle of the input rate code signal and applies via the vital port 3 a VITAL− signal to one side of the output relay corresponding to the incoming rate code. The corresponding one side of the output relays not selected are then maintained by means of isolator circuits at a neutral logic level as hereafter described. On the other hand, the other sides of each of the output relays are tied together and coupled to the VITAL+ signal produced by the checking processor 4 in the event that valid checkwords, also described hereinafter, are produced by the decoding processor 2, thereby indicating failure free performance. In the absence of the production of valid checkwords, checking processor 4 fails to provide a VITAL+ signal, thereby precluding output relay activation regardless of any VITAL− activity at the vital port 3.

Figure 2:
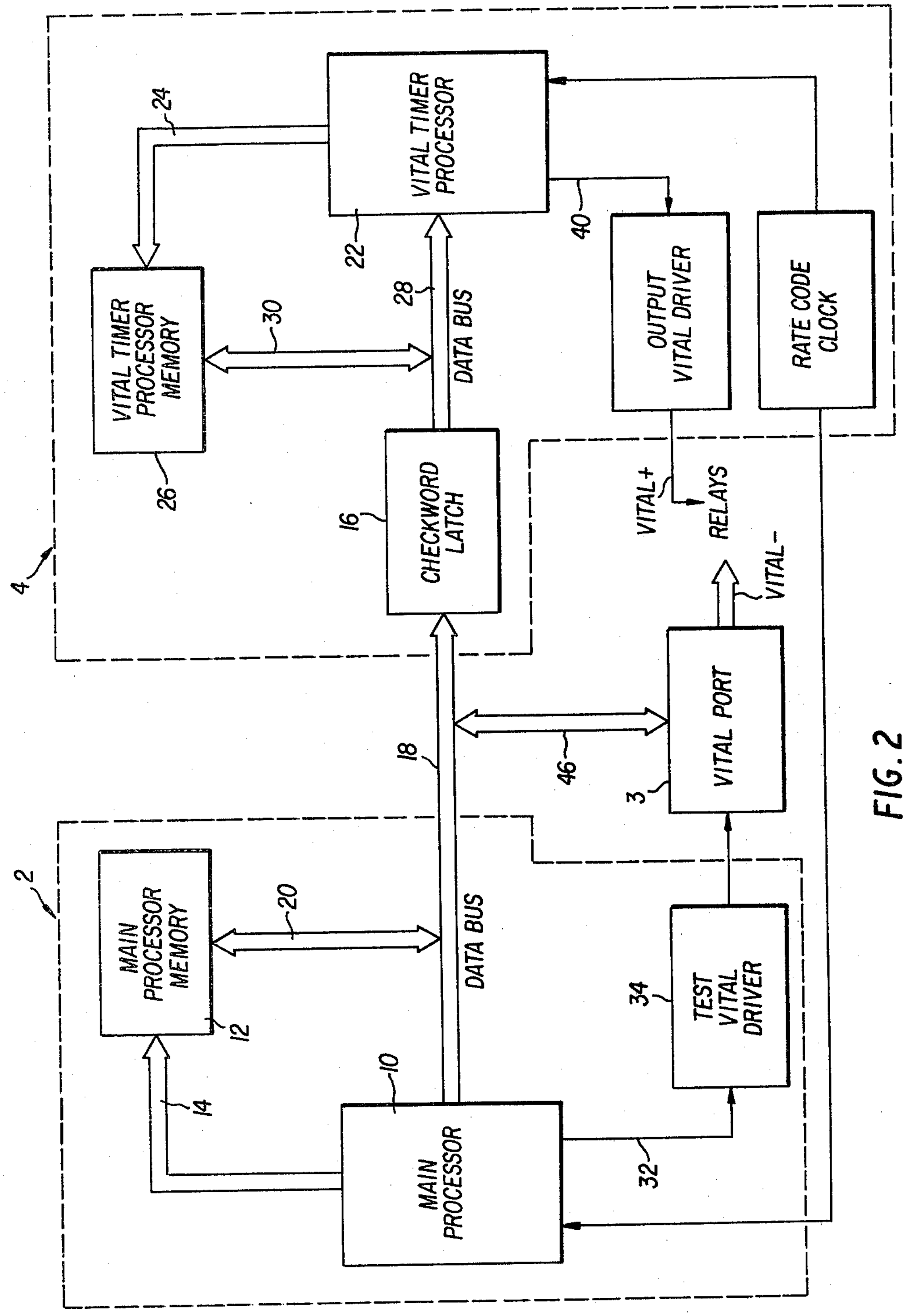
FIG. 2 is another block diagram of the vital rate decoder of the invention illustrating in more detail the rate decoding processor and checking processor.

As seen in FIG. 2, the vital rate decoder is implemented by means of a main processor 10, coupled to a main memory 12, via an address bus 14, and to a checkword latch circuit 16 via data bus 18, which is also coupled to the memory 12 via bus 20. The vital rate decoder of the invention further includes a vital timer processor 22 coupled via address bus 24 to a respective vital timer memory 26 and further coupled via data bus 28 to the checkword latch circuit 16. Vital time memory 26 is also coupled to data bus 28 via bus 30.

The main processor 10 further includes an output line 32 coupled to a test vital driver 34 producing a VITAL− output 36 coupled to a vital output port 38. Similarly, vital timer processor has an output 40 coupled to the output vital driver 6 producing a VITAL+ output 44 applied to the vital output port 38. The vital output port 38 in turn is coupled to the data bus 18 via bus 46.

An overview of the operation of the vital rate decoder of the invention as shown in FIG. 2 is now provided. Code rate input signals are applied to the main processor 10, the programming of which is under the control of programs stored in the main memory 12. The main processor 10 is sensitive to changes in logic level at its pulse input terminal and calculates the period and duty cycle of the incoming pulse inputs. This calculation is done in two phases, i.e. a phase A in which the pulse input changes from a high logic level to a low logic level, and a phase B in which the pulse input changes from a low logic level to a high logic level. Thus, for every half cycle of the incoming pulse input signal a calculation of pulse period and duty cycle is made in either phase A or phase B, which is then compared against the prior phase B or phase A results to determine whether or not an acceptable rate code, and the same rate code, is received in successive overlapping periods of the pulse inputs.

Immediately after a determination is made by the main processor 10 that a permissible rate code has been received, the rate processor enters checking routines for the generation of various checkwords indicative of system performance. These checkwords are stored in the checkword latch circuit 16 and transferred to the vital timer memory 26 via data bus 28 and bus 30 for ultimate utilization by the vital timer processor 22. Additionally, the main processor 10 generates a data byte which is applied via the data bus 18 and bus 46 (which in reality are a single bus) to the vital port 3. The vital port 3 includes an input port and an output port, discussed in more detail hereinafter, with the output port thereof having plural bits each coupled to a respective relay to be driven by the vital rate decoder of the invention. Thus, the data byte corresponding to the identified rate code of the pulse input signals to the main processor is applied through the output port of the vital port 3 to one side of the relays such that a VITAL− signal is applied to one side of the output relay corresponding to the identified incoming rate code. The other side of the output relays are interconnected and coupled to the output 44 of the output vital driver 6 which applies a VITAL+ signal to the output relays after the vital timer processor successively processes the generated checkwords for each overlapping cycle of incoming pulse input signals and for a predetermined time period after identification of different pulse periods and/or out of tolerance duty cycles on alternate overlapping periods in order to allow for an occasional erroneous rate code identification due to noise at the input line to the main processor, as discussed in somewhat more detail hereinafter. Thus, at each half cycle of the pulse input signals to the main processor 10, the rate code of the incoming pulse signals is identified, new checkwords are generated, and vital rate decoder performance verified to determine which, if any, output relays are to be activated for a predetermined time period.

Figure 3A:
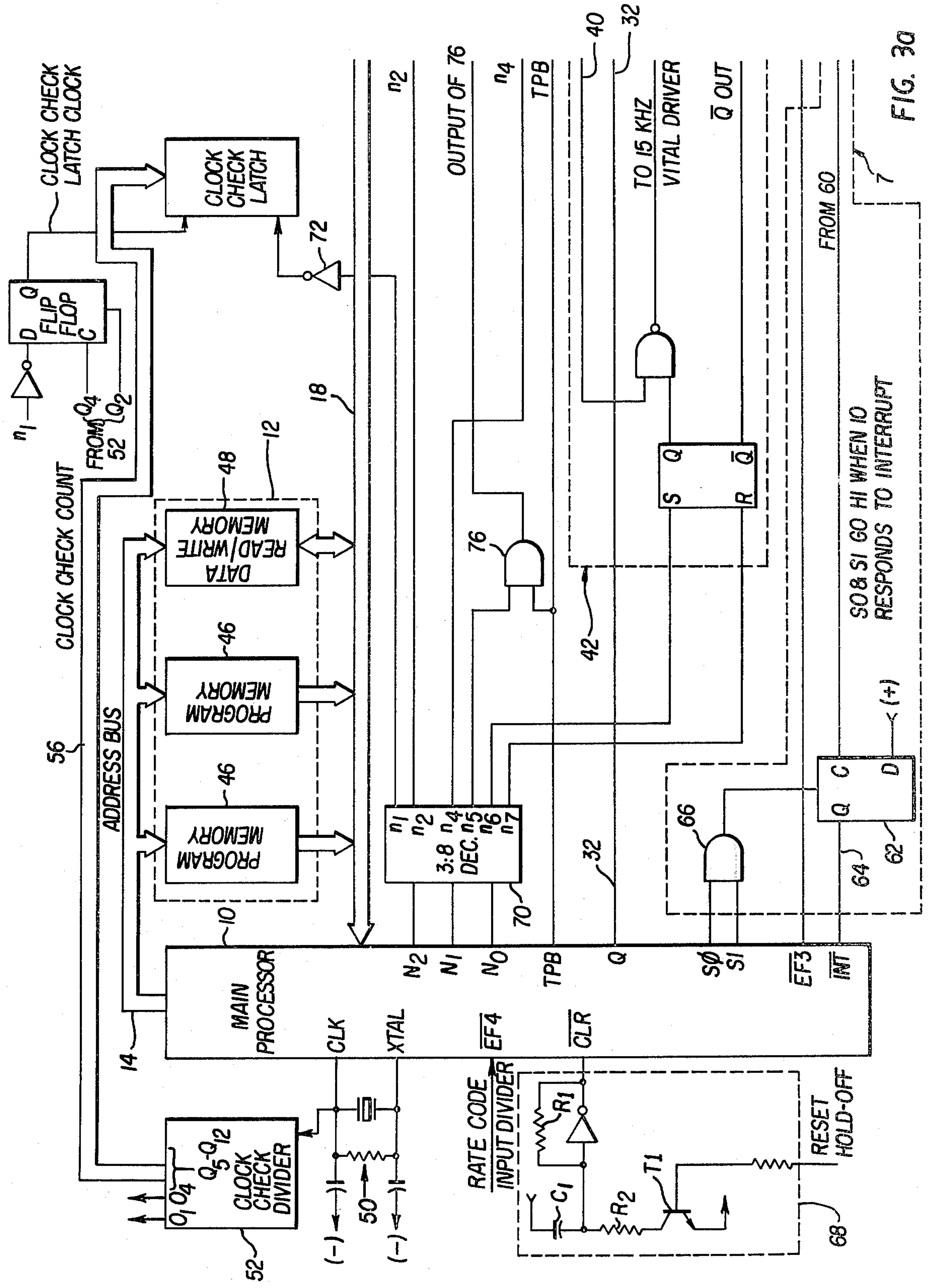
FIGS. 3*a* and 3*b* are more detailed block diagrams of the vital rate decoders shown in FIG. 1.
Figure 3B:
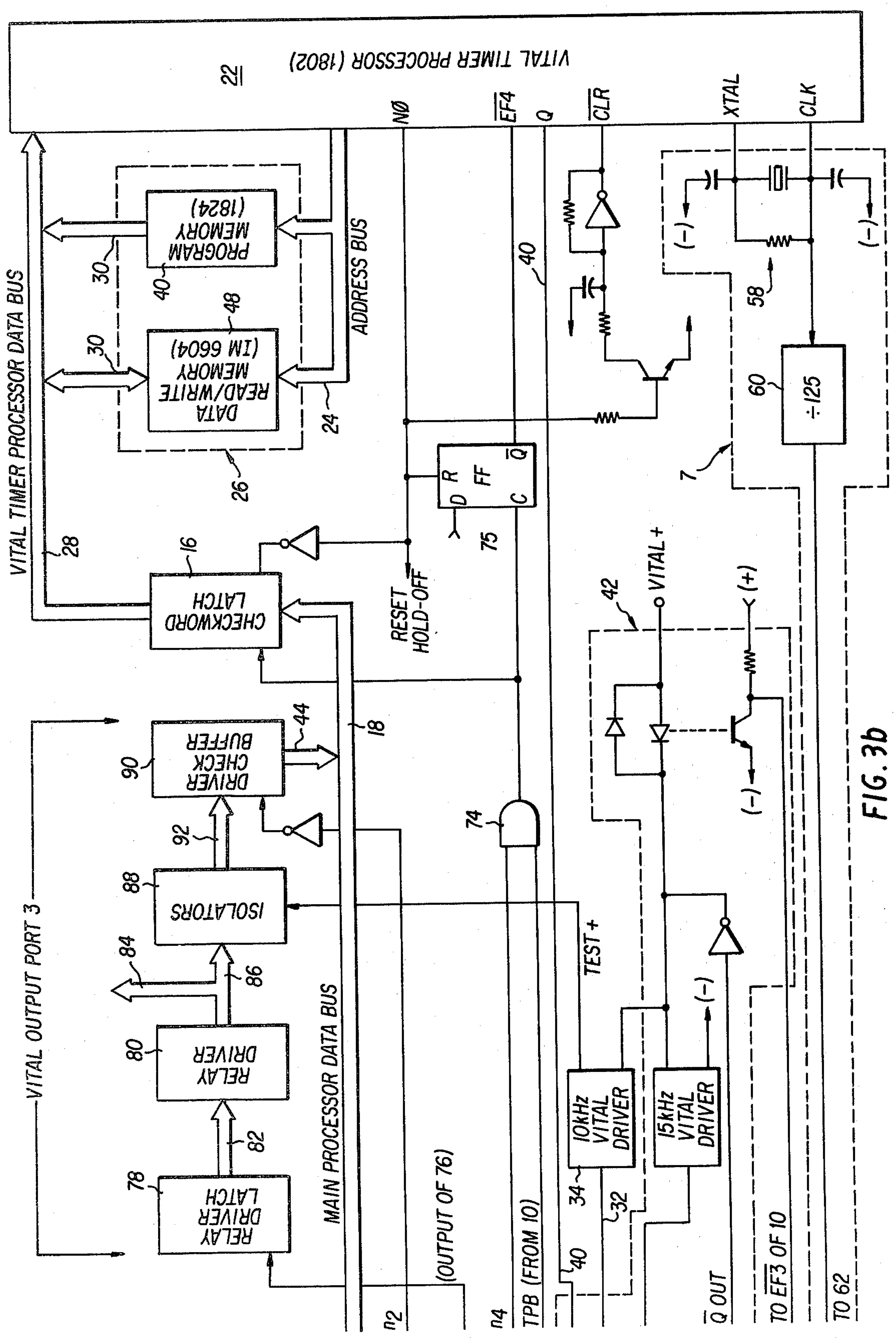

Nextly referring to FIGS. 3*a* and 3*b*, where the hardware of the vital rate decoder of the invention is shown in more detail, it is seen that the main memory 12 is formed of plural program memory units 46, which may be implemented by means of conventional ROM technology, and at least one data read-write memory 48, which may be implemented using conventional random access memory RAM digital logic. The main processor 10 is seen to further include a dedicated crystal clock circuit 50 which applies clock signals to the main processor 10 and to a clock check divider 52 coupled to a clock check latch 54 by means of a clock check bus 56.

The vital timer processor 22 is provided with a dedicated clock circuit 58 for clocking of the vital time processor 22. The output of the clock circuit 58 is additionally applied to a clock divider 60 which performs a divide-by-125 function and has an output connected to a flip-flop 62. Flip-flop 62 in turn has an output 64 coupled to an $\overline{\text{INT}}$ input to the main processor 10 which is used to clock registers in the main processor 10 for rate code identification and as an interrupt in a clock check subroutine as hereinafter described. Thus, clock circuit 58, divider 60, and flip-flop 62 together form part of the rate code clock 7 noted above.

For every output of the divider 60, the output 64 of the flip-flop is caused to change state, causing the main processor to enter a clock check subroutine whereby the period of the clock circuit 50 can be compared to the period of the clock circuit 58 to verify failure free performance of these clock circuits. Upon accepting the output signal 64 at its $\overline{\text{INT}}$ input, the main processor 10 produces a pair of signals, S0 and S1, which are applied through a gate 66 to the reset input of the flip-flop 62 such that the flip-flop 62 changes state and is then ready to accept another interrupt command from the output of the clock divider 60.

As shown in FIG. 3, the vital timer processor memory 26, like the memory 12, includes at least one program memory 46 and at least one data read/write memory 48, which are coupled to the timer CPU data bus 28 by means of the bus 30 (which in reality is a single bus), and to the vital timer processor 22 by means of the address bus 24. Checkwords temporarily stored in the checkword latch 16 are transferred therefrom into the memory 48 for further processing of the vital time processor 22, under the control of the program memory 40 of the vital timer processor memory 26.

Additional circuits shown in FIGS. 3*a* and 3*b* are a pair of reset circuits 68 which are coupled to the main processor 10 and the vital processor timer 22 and which continuously clear registers internal to the two processors 10 and 22 during the time that no pulse rate signals are applied to the $\overline{\text{EF4}}$ input to the main processor 10. Each of the reset circuits 68 is formed of a relaxation oscillator having a time constant determined by capacitor C1 and resistor R1 arranged in relation to transistor T1 and gate G1 such that a clear signal is periodically applied to the processors 10 and 22 at a rate considerably slower than the incoming pulse rate codes to assure that neither of the processors 10 or 22 are inadvertently locked into an erroneous state. However, upon detection of an allowable pulse rate, the vital timer processor 22 is programmed to generate a RESET HOLD-OFF signal at an output NO of the vital timer processor which is applied to the base of the transistors T1 of each reset circuit 68 through a coupling resistor at periodic intervals to assure that the input to each gate G1 of the reset circuit 68 is maintained at a low logic level, thereby preventing further clearing of the processors 10 and 22 for the duration of the RESET HOLD-OFF signal and for a time period thereafter depending upon the time constant of C1 and resistor R2 coupled between the collector of T1 and the junction of C1 and R1, as shown in FIGS. 3*a* and 3*b*.

FIGS. 3*a* and 3*b* additionally show a three-bit to eight-bit decoder having an input connected to three output bits, N0, N1 and N2 of the main processor 10 and having at least seven output bits coupled to various circuits of the vital rate decoder of the invention. The output bits $n_1$ through $n_7$ of the decoder 70 are predetermined to occur at specific time periods during processing of an incoming rate code signal and serve as enable and/or clock signals for the various respective circuits. For example, output $n_1$ of decoder 70 is used as an output disable for the clock check latch 54 through the intermediary of an inverter 72, while the output $n_2$ of decoder 70 is similarly used to disable an output of the vital port 40 discussed in more detail hereinafter. Decoder output $n_4$ is gated with another output TPB by gate 74 to produce a clock signal for loading data from the main CPU data bus 18 into the checkword latch 16 when both the TPB and $n_4$ signals are at a high logic level, and for clocking flip-flop 75 which then produces an output to the vital time processor 22, indicating that a checkword is ready for entry into the processor 22. Similarly, the $n_5$ output of decoder 70 is gated with the TPB output signal from the main processor 10 by means of gate 76 to provide a clock for clocking in data into the vital port 40. Outputs $n_6$ and $n_7$ of decoder 70, on the other hand, are applied to the output vital driver 44 and provide a means for enabling the output signal 40 from the vital timer processor 22 only during time periods during which such enablement may be permitted to occur, and more particularly thereby latching the VITAL+ signal to the relays to a predetermined logic state during testing of the vital port by means of the test output 32 from the main processor 10, as is again described in more detail hereinafter.

Figure 4:
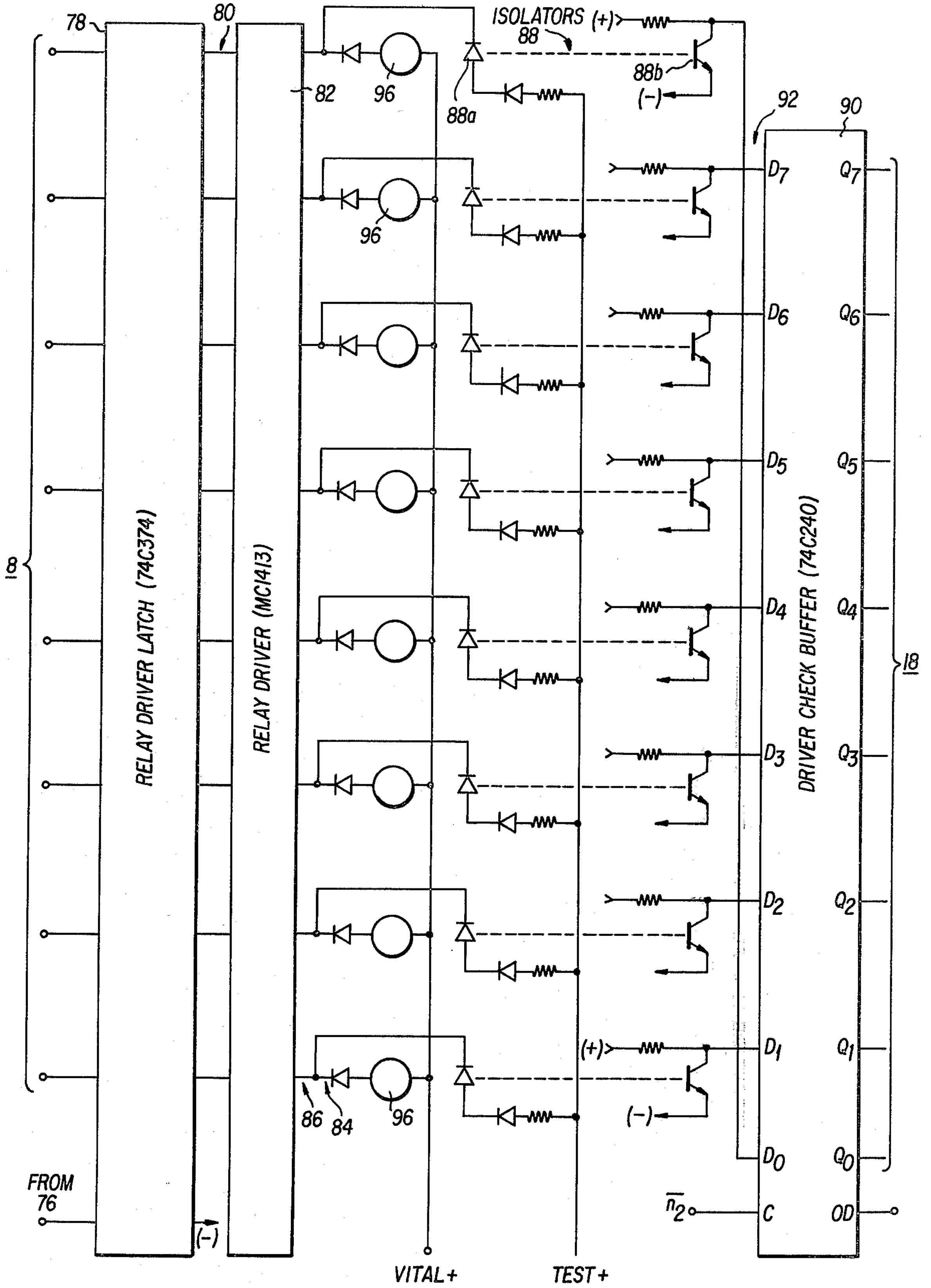
FIG. 4 is a circuit diagram of the vital port of the vital rate decoder of the invention.

The vital port 3, which is shown in block form in FIG. 3*a* and the circuits of which are shown in detail in FIG. 4, is seen to include a relay driver latch 78 serving as an input port to the vital port 3 which is coupled to relay drivers 80 by means of a bus 82. The output of the relay drivers 80, as shown in FIG. 3, is coupled by bus 86 and bus 84 to output relays to provide a VITAL− signal to the relay corresponding to the rate code identified by the main processor. Bus 86 is then further coupled to isolators 88 having outputs coupled to bus 92 and delivered to driver check buffer circuit 90 serving as an output port for the vital port 3. Buffer circuit 90 is coupled to the main processor data bus 18 by means of bus 94.

As shown in FIG. 3, optical isolators formed by light emitting diode 88*a* and a light sensitive transistor 88*b* are coupled to the bus 86 such that the application of a VITAL− signal to any one of the particular relays causes luminescense of the optical isolator light-emitting diode 88*a* coupled to the particular bit of bus 86 when a TEST+ signal 36 is generated by the test vital driver 34. The collectors of each of the isolator transistors 88*b* are coupled to the driver check buffer or output port 90 of the vital port 40 with a one-bit shift for the purpose of enabling a port test routine as described in later paragraphs. Optical type isolators are advantageously selected to isolate the output port 90 from the input port 78 of the vital port 40 in view of the high immunity of these type isolators from noise as typically occurs due to the connection of the isolators to the output relays 96. It is noted, however, that whenever a TEST+ signal is applied to the vital output port 3, the VITAL+ applied to the relays as shown in FIG. 4 is latched and maintained at a low state by means of the $n_6$ and $n_7$ outputs of the decoder 70 to preclude premature activation of the output relays 96.

Details of the test vital driver 34 and the output vital driver 6 are shown in FIG. 4. The test vital driver is designed to accept a time varying test signal 32 from the main processor 10, filter the test signal, rectify the filtered test signal and provide a TEST+ signal 38 to the vital output port 38 as above discussed. Thus, the test vital driver includes a buffer driver stage 96 which drives a low impedence filter stage 98 which in turn is transformer coupled to rectifier stage 100, the output of which is capacitively filtered to produce the TEST+ signal 32. The main processor 10 is programmed to change the output level of the output signal 32 to the test vital driver 34 at a 10 kHz rate, which of course is the frequency to which the filter stage 98 is tuned. Thus, a TEST+ signal 32 is generated only in the event that the main processor successfully generates a 10 kHz test signal 32 by means of test routines stored in the program memory 46 of the main processor memory 12, thereby providing a further check as to the failure free operation of the main processor 10.

The output vital driver 6 is constructed in a similar fashion like the above-described test vital driver 34, except that the filter stage 98 of the output vital driver is naturally tuned to the frequency of the vital output signal 40 generated by the vital timer processor 22, which in this instance is 15 kHz. As shown in FIG. 4, however, the output vital driver includes additional logic clocked by the n6, n7 outputs of the decoder 70 to assure that the VITAL+ output of the output vital driver 6 is disabled during the test sequence in which the TEST+ signal is generated. Additionally, the VITAL+ signal generated at the output of the rectifier stage of the output vital driver is optically coupled through a separate optical isolator circuit 100 back to a separate input of the main processor 10 as a means of informing the main processor 10 as to the successful generation of a VITAL+ output signal.

A more detailed description of the operation of the vital rate decoder of the invention is nextly described.

As noted above, the main processor 10 of the invention is assigned the task of identifying the code rate of the rate code signal applied thereto, and does so in two phases which overlap by a half-cycle of the incoming signal. Thus, when the incoming rate code signal changes logic level, one of the two phases of the main processor routines is initiated such that a counting register internal to the processor 10, and not shown in the drawings, is loaded with a first rate window number stored in memory and then decremented by means of the main processor clock circuit 50 until this counting register is decremented to zero. The time taken to decrement the first rate window to zero is selected to be equal to the minimum permissible period of the incoming rate code, or stated differently, corresponds to input signals having frequencies greater than the highest allowable code rate. Thus, if the logic level of the incoming rate code signal changes one complete cycle prior to decrementing of the first rate window to zero by the main processor 10, this fact is indicative of a code rate faster than the fastest permissible frequency of the allowable incoming rate code signals, indicating that no valid rate code has been identified. Therefore no further action is taken by the main processor, and the phase A processing subroutine of the main processor 10 is reinitiated to again apply the first rate window to the counting registers of the main processor 10 upon the detection of a logic change of the incoming rate code signal from a first level to a second level.

If, on the other hand, the first rate window is decremented to zero in the counting registers of the main processor 10, then these counting registers are loaded with a second rate window word corresponding to the maximum tolerance permissible of the fastest rate code of the incoming rate code signal. This second rate window word is also then decremented to 0 in the counting registers, as was the first rate window word, with the main processor again monitoring the rate code signal for a change of logic level indicative of the expiration of one period of the incoming rate code signal. If this occurs during the second rate window word, the amount of time of which corresponds to the permissible tolerance of the highest frequency anticipated, then this fact is indicative of a rate code corresponding to the highest allowable frequency and the main processor is then programmed to enter checking routines as hereinafter described.

As noted above, during phase A processing of the incoming rate code signal, the main processor 10 detects the time taken in decrementing counting registers from the time beginning when the rate code signal changes from a first logic level to a second logic level, back to the first logic level, and then back to the second logic level, or one full cycle of the incoming rate code signal. Additionally, the main processor 10 further detects the half cycle point of the incoming rate code signal, i.e. the time taken from when the incoming rate code signal changes from the first logic level to the second logic level and then back to the first logic level. The half cycle time is converted into a binary logic word, hereinafter called a partial word, and is derived from an additional counting register which continuously counts each clock to the decrementing counting registers. If, for example, a valid incoming rate code is detected as a result of a requisitie logic level change during the decrementing of the second rate window word, a remainder word is generated based on the count of the decrementing counting registers at the time of occurrence of the cyclic rate code logic level change and is stored in memory 48 along with the partial word previously generated for verification of an acceptable duty cycle, i.e. a duty cycle within allowable tolerances. If, however, the rate code signal does not change logic level from the second logic level back to the first logic level during the decrementing of the second rate window word, but instead the second rate window word is decremented to zero, then a third rate window word is loaded into the counting registers of the main processor 10 and again decremented as was done with the first and second rate window words. The third rate window word establishes a second period in which no acceptable code rate signal will change logic level from the second logic level back to the first logic level, or in other words corresponds to code rate range between the fastest and the next fastest acceptable code rates. Thus, if the main processor 10 detects a full cycle return to the first logic level during the third rate window word, this factor is indicative of an unacceptable code rate, and the main processor code rate routine is initialized again to the first rate code word. However, if on the other hand a second return to the second logic level is not detected during the decrementing of the third rate window word, and the counting registers are decremented to zero, then a fourth rate window word corresponding to the second highest frequency of acceptable code rates is loaded into the counting registers of the main processor 10 and then decremented awaiting the detection of the completion of a full cycle of the incoming rate code signal, indicating a valid code rate corresponding to the second highest permissible frequency. In the event that a cycle completion detection is made by the main processor during decrementing of the fourth rate window word, then a remainder word is generated and stored in the memory 48 for further processing along with its associated partial word to determine whether to not the incoming rate code signal having a frequency corresponding to the second highest frequency additionally is characterized by a duty cycle within acceptable predetermined tolerances.

If the fourth rate window word is decremented to zero in the counting register of the main processor 10 before a cycle completion detection is made by the main processor 10, then a fifth rate window word corresponding to another unacceptable frequency range is loaded into the counting registers 10 which are then again decremented. If a cycle completion detection is noted during the decrementing of the fifth rate window word, or any subsequent odd numbered rate window word, then an impermissible or unacceptable code rate is indicated and the code rate processing routines of the main processor 10 are initialized to the first rate window word. On the other hand, if no cycle completion detection is made during the fifth rate window word, then a sixth rate window word corresponding to the third highest permissible frequency of incoming rate codes is loaded into the counting registers of the main processor 10 and decremented. If a phase A cycle completion detection is then made during the decrementing of the sixth rate window word, or any subsequent even numbered rate window word, then an acceptable rate code is detected, a remainder word is formed and the remainder word and the corresponding partial word are stored in the memory 48 for further duty cycle tolerance processing.

Phase B processing of the incoming rate code signal is accomplished in much the same manner as the phase A processing, as described above. However, loading of the rate window words into respective phase B counting registers within the main processor 10 is accomplished during phase B whenever a logic level change of the incoming rate code signal is detected from a second logic level or low level to a first logic level or high level, opposite to the convention used for the phase A processing of the incoming rate code signal. In this way, the phase A and phase B rate code processing routines process complete cycles of the incoming rate code signal which overlap by one-half cycle. However, the end product of the phase B routine, assuming detection of a valid rate code, again is a remainder word based on the count remaining in the counting registers upon detection of a cycle completion, and its corresponding partial word.

Since passive decoders of the prior art typically reject signals having ON and OFF times differing by more than 20%, the rate decoder of the invention is designed to perform duty cycle check tests on the incoming rate code signal to this limit. However, any duty cycle tolerance limits may otherwise be specified, since the duty cycle checks are implemented by means of table values as hereinafter described, which table values may be specified differently for each code rate if so desired.

The duty cycle of the incoming rate code signal is checked by a subroutine which performs simple arithmetic functions on the measured ON and OFF times as represented by the remainder words and partial words previously stored in the data read/write memory 48 of the main processor memory 12.

Figure 5:
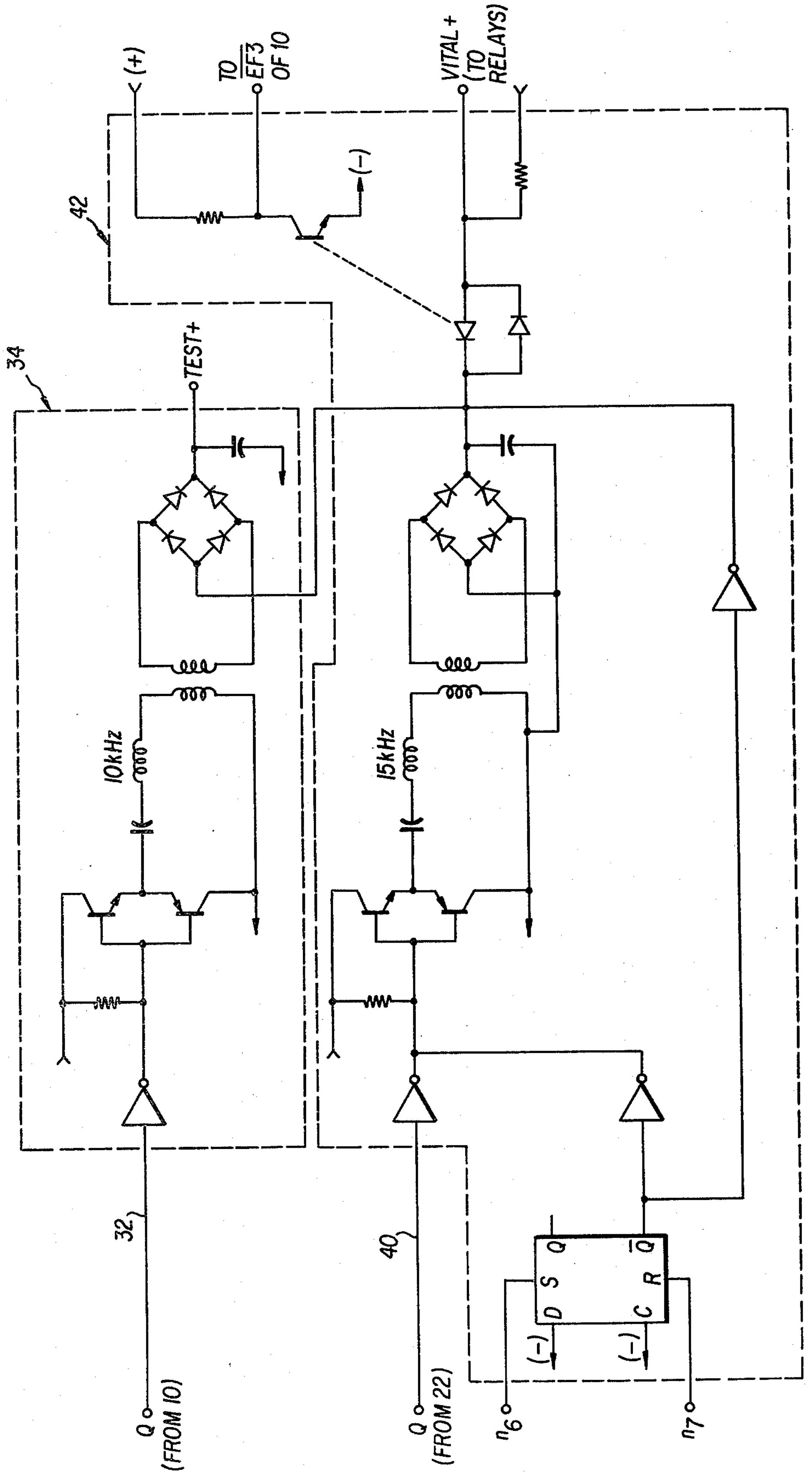
FIG. 5 is a circuit diagram illustrating details of the test and output vital drivers of the rate decoder of the invention.
Figure 6:
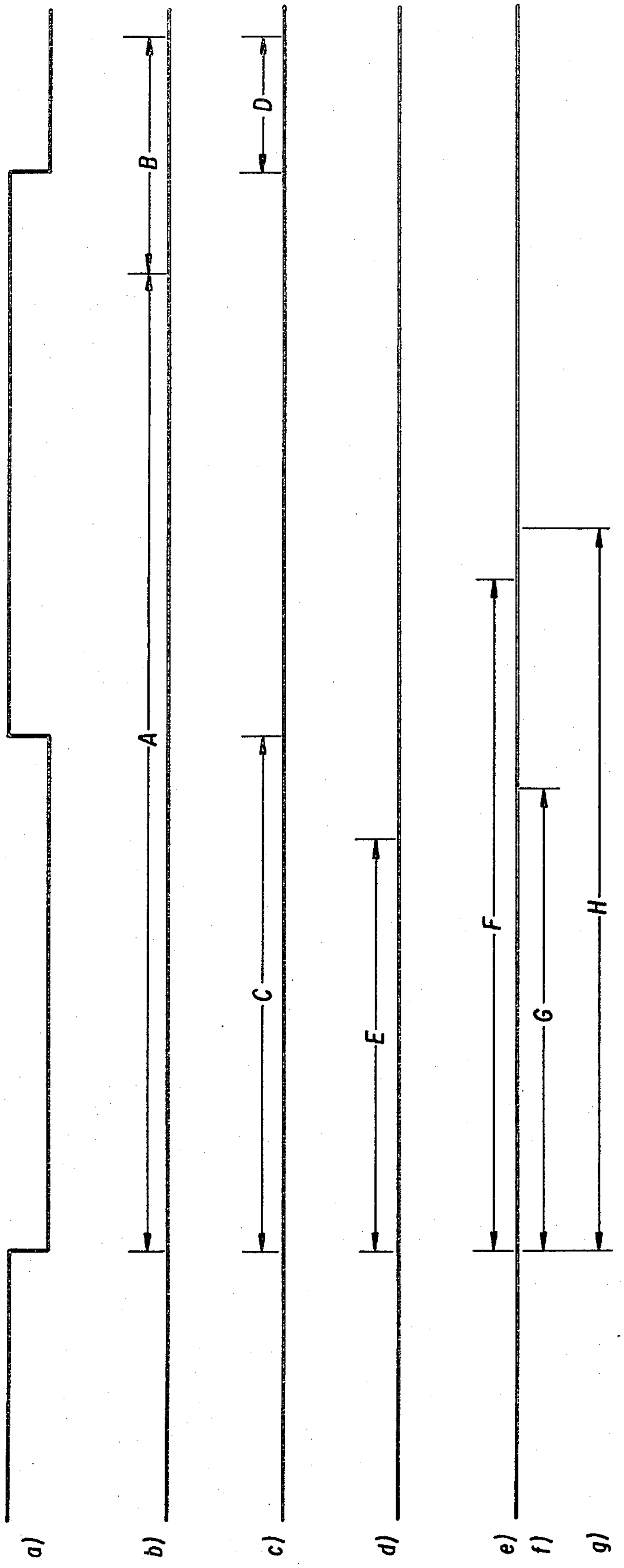
FIG. 6 is a schematic diagram illustrating selected time intervals used for rate code identification and duty cycle testing.

Referring now to FIG. 5, the arithmetic duty cycle tolerance checking routines are nextly described. FIG. 5(*a*) illustrates a typical rate code signal waveform as may, for example, be processed by the phase A rate code processing routine of the main processor 10. As shown in FIG. 5(*b*) the time period designated by the reference A is indicative of the time of duration of decrementing of a first rate window word, while the designation B is indicative of the time period of decrementing of the phase A counting registers during the decrementing of a second rate window word corresponding to the maximum permissible code rate signal frequency. The time period represented by the designation C corresponds to the half-cycles of the code rate signal as represented by the partial word formed by the main processor 10, which partial word may simply be the output of a counter clocked by the same clock decrementing the previously described counting registers for the time period as indicated by reference C. The reference designation D shown in FIG. 5(*c*), on the other hand, corresponds to the remainder word generated by the decrementing of the main processor counting registers upon detection of a phase A cycle completion. The reference designation E in FIG. 5(*d*) corresponds to the minimum permissible partial word, while the reference designation F shown in FIG. 5(*e*) corresponds to the maximum permissible partial word, the time intervals represented by E and F jointly representing the duty cycle tolerance range. The time intervals represented by designations G and H, as shown in FIGS. 5(*f*) and 5(*g*), respectively, represent test values stored in memory and which are compared against the numbers represented by E and F in a test routine designed to verify that the main processor of the invention is capable of detecting an out of tolerance range duty cycle.

The arithmetic routines of the duty cycle check test sequence begins with the normalization of the partial word C stored in memory upon the logic level change from the second logic level to the first logic level, as shown in FIG. 5(*c*). Normalization of a partial word to a nominal value is necessary in view of the fact that the second rate window word corresponds to a permissible range and it is therefore necessary to normalize the measured partial value to the median of the range defined by the second rate window (or even numbered rate window if subsequent higher order rate windows are being tested). Normalization is achieved by shifting left the stored remainder word to accomplish a multiplication by a factor of 2. Thereafter the product of the multiplication is subtracted from the particular rate window word, during which a cycle completion detection is made, whereupon the result of the subtraction is shifted right to divide by two, with the quotient of the division then subtracted from the observed partial value to derive a normalized partial word C′ which can be defined by the following relationship:

$$C' = C - (B - (2 \times D))/2 \qquad (1)$$

After deriving the normalized partial value C′, the normalized partial word C′ is compared to at least either the minimum partial word G, computed as 40% of the measured period defined by a cycle completion detection in the particular rate window word, or the maximum permissible partial word F shown in FIG. 5(*e*), computed as 60% of the measured period. Accordingly, the following relationships are necessary for the verification of duty cycle within the allowable tolerances:

$$C' - E > 0 \qquad (2)$$

$$F - C' > 0 \qquad (3)$$

It is noted, however, that since duty cycle tolerances are checked for both phase A and phase B, it is only necessary to check the normalized duty cycle of each phase relative to either the maximum or the minimum allowable duty cycle, since the effect of comparing, for example, the normalized duty cycle against the minimum duty cycle tolerance range in phase A is equivalent to testing the duty cycle tolerance for a phase B normalized partial word against the maximum tolerance.

A further feature of the duty cycle checking routines of the invention resides in a test made to ensure that it is in fact possible to detect an out of tolerance duty cycle variation. For that purpose, the main processor memory 12 includes duty cycle test words for each allowable rate code, which duty cycle test words represent hypothetical normalized partial words which fall outside the tolerances established by the words E and/or F for each rate code. For example, for the first rate code the main processor memory 12, which stores recycled test words G and/or H, as shown in FIGS. 5(*f*) and (*g*), which respectively clearly fall outside the tolerance limits established by the maximum and minimum values illustrated as E and F shown in FIGS. 5(*d*) and (*e*), respectively. Thus, after each duty cycle verification, the duty cycle tolerance test subroutine continues with a further step of subtracting E from G and/or H from F, with the remainder of the subtraction being utilized as a duty cycle test checkword which is transferred via checkword latch 16 to the vital timer processor memory 26 for later utilization thereby.

The main processor 10, based on the rate window word being decremented during a cycle completion detection in either the phase A or the phase B rate code identification routines, produces a pointer checkword indicative of the incoming code rate, for both of phases A and B, which pointer checkword is applied to the relay driver latch 78 of the vital port 3, and coupled through the isolators 88 to the driver check buffer 90, and from there via the bus 94, bus 18, and checkword latch 16 to the vital timer processor 22. The individual bits of the pointer checkword are therefore utilized for the application of a VITAL− signal to the output relay corresponding to the code rate of the incoming code rate signal. Additionally, the pointer checkwords transferred through the isolators 88 to the vital timer processor 22 are stored in the data read/write memory 48 of the vital processor memory 26 for later utilization as hereinafter described.

Nextly described is the cycle checking and diversity techniques employed in the checking routines of the vital rate decoder of the invention.

As noted earlier, the processors 10 and 22 are respectively provided with clocks 50 and 58 for clocking of the various processor routines. Since the clocks 50 and 58 employ crystals, and are therefore very stable, the checking routines of the invention verify that the clocks 50 and 58 maintain a predetermined relationship over a predetermined number of cycles thereof. Thus, the rate code clock output of the divider 60, as applied to the main processor 10 through the flip-flop 62 is utilized not only for the clocking of the counting registers as described above for rate code identification and duty cycle tolerance testing, but also to initiate a clock check routine wherein selected bits of the clock check divider 52 are clocked into the clock check latch 54, and subsequently used to address a clock check table stored within the main processor memory 12. Thus, each time an interrupt signal is applied on the line 64 to the $\overline{INT}$ input of the main processor 10, the count of the clock check divider 52 is used to address a clock check table within the memory 12 with the contents so addressed being utilized to form a clock check checkword which is transferred via the checkword latch 16 for storage in the data read/write memory 48 of the vital timer processor memory 26. Since the clocks 50 and 58 are asynchronous, it is possible that the clock check divider may assume any one of three counts and accordingly the clock check table within the main processor memory 12 is provided with only three address locations which contain a valid clock check checkword.

After formation of the clock check checkword, and after the generation of a pointer checkword as described above, the vital port of the invention is tested by means of a port test routine as described in my commonly owned U.S. Application Ser. No. 007,184 filed Jan. 29, 1979 and now abandoned, wherein the main processor 10 is programmed to scan the vital output port by applying test words to the main data bus, in which only one of the bits of the test word is at, for example, a high logic level while the other bits are maintained at a low logic level, while simultaneously producing a test output signal 32 resulting in a TEST+ signal applied to the isolators 88, the test data word on the bus 18 being fed through the latch 78 through the isolators 88, the buffer 90, and back to the data bus 18 with a one bit shift as an echo input to the main processor 10 for reapplication to the latch 78, etc. The main processor 10 therefore loops through the sequential application of the shifted echo word from the driver check buffer until the single high logic level bit is returned to its initial starting position, while concurrently counting the number of cycles taken for the high level logic bit to travel back to its initial position. The number of cycles taken for the recycling of the high logic level bit is then utilized as the port test word, and transferred for storage in the vital timer processor memory 26.

As noted above, previously stored in the vital timer processor memory 26 was a pointer word corresponding to the identified rate code to the incoming signal, and also an output test word corresponding to the pointer test words shifted through the vital port 3 and transferred to the memory 26. The output test words, which incidently are generated for each phase A and phase B rate code identification routine of the main processor 10, are utilized by the vital timer processor 22 to address a DELTA table within the memory 26 to fetch a DELTA checkword therefrom for later arithmetic combination with the pointer checkword corresponding thereto. Since a different pointer checkword will be generated for each different rate code, it is necessary to normalize the pointer checkword by addition to a respective DELTA checkword for later utilization in the vital output program of the vital timer processor 22. The normalized pointer/DELTA checkword is stored in the checkword memory portion of the data read/write memory along with the other checkwords generated as above described.

The vital timer processor 22 is organized to provide the vital rate output 40 continuously so long as valid checkwords are generated and for a predetermined time after non-identical pointer checkwords are produced. To assure that successively identical pointer checkwords are generated, the processor 22 is provided with a pair of stacked registers in which successively generated pointer checkwords are loaded and compared. If the comparison indicates that the successively generated pointer checkwords are identical, then the vital timer processor will produce a vital rate output for a predetermined time period, which is arbitrarily selected as longer than the time of generation of successive pointer checkwords to allow an occasional miss due to noise in order to maintain an output relay continuously energized for the predetermined time period.

The predetermined time period during which the vital rate output 40 is applied to the output vital driver 6 is generated by loading a pair of predetermined bytes into respective counting registers, and alternately decrementing and incrementing respective registers until the registers reach a predetermined count, for example, zero as disclosed in my above cross-referenced U.S. Pat. No. 4,090,173. If two successively generated pointer checkwords are identical, and after generation of the other checkwords, these checkwords, i.e. the port test, clock check, output test, normalized pointer, and memory test (to be hereinafter described) checkwords, are utilized by a vital program stored in the memory 40 of the vital timer processor memory 26 to load the predetermined bytes into the vital timer processor vital counting registers. It is noted, however, that these checkwords are delivered to the processor 27 as they are formed, after intermediate table values have been added to change them to instruction codes.

Building on the above description, when two consecutive identical pointer words are generated, the vital time program stored in the vital timer processor memory 26 loads two two-byte numbers, T+, t+, and T, t, into the complementary registers (16 bits per byte), each of which is then decremented. The bytes are stored in a table memory which is addressed by selected checkwords, with the selected bytes being loaded into respective registers under the control of a program routine using other selected checkwords as instruction codes. The values of the byte numbers loaded into the registers are selected to provide the desired time for generation of the vital output signal 40 until they are decremented to zero. Byte T+, t+ is specified to be equal to byte T, t+1. Duplicates of these numbers are stored in the data read/write memory 48 of memory 26 since the microprocessor selected for the implementation of the processors 10 and 22 does not provide arithmetic operations on the registers.

The vital timer processor vital program then decrements the two bytes stored in the complementary registers to generate the desired time intervals. The decrementing procedure is checked by testing the values in the registers against each other at every decrementing step.

Set and reset instructions spaced evenly throughout the vital timer program toggle a flip-flop internal to the vital timer processor 22 to generate the fixed frequency vital rate output signal 40 during the time interval of the decrementing of the complementary registers. This frequency signal drives the tuned vital relay driver 42, as shown in FIGS. 1, 2*a* and 2*b*, which generates the VITAL+ signal for energization of the output relays corresponding to the incoming rate code. The tuned vital driver assures that the processor clock is operating on the correct frequency and that therefore the time intervals are likewise correct.

An important feature of the vital checking routines of the invention resides in the fact that new checkwords are generated for each phase of rate code identification i.e. both phase A decoding and phase B decoding, with the new checkwords being utilized in the vital timer processor program for generating the vital output signal 40 which drives the output vital driver 42. As noted above, the checkwords are used to control loading of the pairs of bytes into the vital counting registers of the vital timer processor 22, which is then followed by decrementing and comparing of the vital counter contents during production of the vital rate output signal 40. However, once a checkword is used in the vital program, it is desirable to ensure that that checkword is not again used and that a new checkword will be generated in its place, thereby continuing to verify failure free performance of the vital rate decoder of the invention. To that end, after the checkwords previously formed are utilized in the vital program, the memory locations containing the checkwords are cleared, and dummy words contained in another portion of the memory are loaded in their place and then summed in separate routines to produce a memory test checkword which is further utilized, like the other checkwords, in the vital output program. Thus, each of the checkwords, except the most recently produced pointer checkwords, is cleared from memory after utilization by the vital program controlling decrementing of the vital timer processor vital counting registers.

As noted above, the most recently produced pointer checkword is not destroyed immediately after use since to do so would preclude comparison with the nextly produced pointer checkword by which verification of continuous rate code is determined. It is for this reason that the stacked registers, noted above, are employed, whereby upon completion of the comparison and utilization of the most recently formed checkword, the first register in the stacked registers is loaded with a dummy word, with the most recently produced pointer word being shifted to the other register of the stacked registers for comparison with the nextly produced pointer checkword. Then, the stacked register loaded with the dummy word is read, to assure that the same pointer word will not inadvertently be utilized in subsequent vital program operations, and summed with the other dummy memory test words previously loaded into the checkword memory locations and retrieved therefrom for formation of the memory test checkword. Naturally, upon utilization of the memory test checkword in the vital timer processor program, the memory location storing the previously generated memory test checkword is likewise cleared and stored with a dummy test word which is summed with the other dummy test words read out from the checkword memory locations.

Flow charts illustrating the vital rate decoding routines of the decoder of the invention are now presented as follows:

```
Start
|
Initialize program counters and data registers
|
Clear data registers
|
Enable interrupts
|
Wait
|
Initialize clock
|
Call main program at WAIT

First Interrupt
|
Read clock
|
Store in old clock
|
Return
```

-continued

```
Interrupt P = R1
|
Save status
|
Read clock
|
Subtract old clock
|
Get clock check number, put in clock check register
|
Number not OK? - Clock Error
|
Decrement interrupt counter
|

Count = φ ? - No Code Error
|
Decrement Limit A
|
Limit A past φ ? - Limit PTR = φ ? - Range Error
|                      |
|                  Load new limit
|  <-------------------|
Increment Limit B
|
Limit B = φ ? - Limit PTR = φ ? - Range Error
|                    |
|                Load new limit
|  <-----------------|
Test Input Flag

Test Input Flag
|
Flag = 1 ? - Loop 2
|
Loop 1
   |
   Flag = 1 ? - << Exit
   |
   Continue
   |
End Loop
|
Do A

Loop 2
   |
   Flag = φ ? - << Exit
   |
   Continue
   |
End Loop
|
Do B

A
|
Store partial B
|
Store pointer A and remainder A
|
Load initial pointer and limit A
|
Point main PC to process A
|
Reset interrupt counter
|
Return
```

-continued

```
B
Store partial A
Store pointer B and remainder B
Load initial pointer B and limit B
Point main PC to Process B
Reset interrupt counter
Return

Process A P = R3
Get remainder r, shift left
Subtract from limit per pointer A
Shift right (2 ×), round up
Subtract from partial A
Call Duty Cycle Test
DC Error *if duty cycle is OK, return by passes Error
Store small partial A *test Duty Cycle Test
Call duty cycle test
Add constant to check word, skip
Idle *If test fails, return to here

Get pointer A, shift right
Data Flag = 1 ? ―― Range Error
Select output, add to B checkword
Call Port Test
Deliver output
Read port, add to A checkword
Deliver checkword, turn on vital+
(Range Error branch rejoins here)
Wait

Process B P = R3
Get remainder r, shift left
Subtract from limit per pointer B
Shift right, round up
Subtract from partial B
Call Duty Cycle Test
DC Error
Store large partial B
Call Duty Cycle Test
Add constant to checkword, ship
Idle
Get pointer B, shift right
```

-continued

```
Data flag = 1 ? ―― Range Error
Select output, add to A checkword
Call Port Test
Deliver output
Read port, add to B checkword
Deliver checkword, turn on VITAL+
(Range Error branch rejoins here)
Wait

Clock Error P = R1
Store error bit 1
Return

No Code Error P = R1
Store error bit 2
Return

Duty Cycle Error P = R3
Store error bit 4
Wait

Range Error P = R3
Store error bit 8
Wait

Port Test Error
Store error bit 1 ϕ
Idle

Duty Cycle Test P = R4
Subtract minimum
Result (−) ? - Return
Subtract from ( 2 × max bias)
Result (−) ? - Return
Increment main PC
Return

Port Test P = R4
Test VITAL+ flag
Turn off VITAL+
Delay
Check VITAL+ flag
Start TEST+
Load ϕ 1 in port byte
Initialize loop counter 801 + 8 = busy flag
Loop
```

-continued

Check VITAL+ flag
Deliver port byte
Delay
Read port, complement
Port = $\phi$ ? - Error -
Increment checkword
Shift right
Port = $\phi$ ? - << exit
Shift left
Decrement loop count
Loop count = $\phi$ ? - Error -
Continue loop
End loop
End TEST+
Return to main program Time Program Start
↓
Decrement t+
↓
t+ = $\phi$ ? [Yes → X]
↓ No
t+ = [t] ? [No → Idle]
↓ Yes
Decrement t+
↓
t+ = $\phi$ ? [Yes → X]
↓ No
t+ = [t] − 1 ? [No → Idle]
↓ Yes
C → Set [t−] = t+
↓
Decrement t
↓
t = $\phi$ ? [Yes → Y]
↓ No
t = [t+] ? [No → Idle]
↓ Yes
Decrement t
↓

-continued t = $\phi$ ? [Yes → Y]
↓ No
t = [t+] − 1 ? [No → Idle]
↓ Yes
D → Set [t] = t
↓
Go to Interrupt and Output Tests X
↓
T+ = $\phi$ ? [Yes → Done]
↓ No
T+ = [T] ? [No → Idle]
↓ Yes
T+ = [T+] ? [No → Idle]
↓ Yes
Decrement t+
↓
T+ = [T+] ? [Yes → Idle]
↓ No
T+ = [T+] − 1 ? [No → Idle]
↓ Yes
Set [T=] = T+
↓
T+ = [T] ? [Yes → Idle]
T+ = [T] − 1 ? [No → Idle]
Yes
*Decrement t+
Go to C Done
Go to Next Phase Y
↓
[T] = $\phi$ ? [Yes → Done]
↓
T = [T+] ? [Yes → Idle]
↓ No
T − 1 = [T+] ? [No → Idle]
↓ Yes
T = [T] ? [No → Idle]
↓ Yes
Decrement t
↓

-continued

T − 1 = [T] ? — Yes → Idle
↓ No
T − 1 = [T] − 1 ? — No → Idle
↓ Yes
Set [T] = T
↓
T = [T+] ? — No → Idle
↓ Yes
**Decrement t (2 ×)
↓
Go to D

*t+ must be decremented before returning to t+ part of time program to compensate for the effect on t+ due to the branch to A.
**t must be decremented twice before returning to t part of time program to compensate for the effect on t due to the branch to B.

Recapitulating, the Vital Rate Decoder of the invention will decode any number of rate codes, up to 7, and drive a vital relay for the detected code. The code rates, rate tolerance and duty cycle tolerance are features of software design and are easily selected for each application, so that the vital rate decoder is a highly flexible unit. Since code rates are measured by digital techniques using a crystal clock reference, naturally the vital rate decoder of the invention is characterized by extremely high accuracy in its verification and identification of particular code rates.

Each code rate received by the vital rate decoder of the invention causes a particular vital relay associated therewith to be energized, similar to the performance of passive decoders known in the prior art. However, since the microprocessor vital driver is used, the sustaining time of the output relay associated with the incoming rate code is more closely controlled than it can be controlled by the capacitor timing used with passive decoders. This closer control therefore may allow shorter headways. Also, response time and code parameter tolerance may be closely matched to the values obtained with passive decoders.

The main vital programming decoding tables will fit into 1K bytes of ROM and the execution time will allow decoding to the fastest presently used code rate (21.5 Hz) without undue speed requirement of the processor. The vital driver processor will operate with ½K bytes of ROM. Thus, both the main processor and vital timer processors of the invention have been implemented using COSMAC 1802 microprocessors.

Two microprocessors are employed by the vital rate decoder according to the invention. Each processor has its own crystal clock which provides the diversity needed to insure that timing is vital. The main processor has two output ports. One port is used to drive the selected output relay. The second port delivers a vital checkword to the vital timer processor. The output relay port is a *vital* port. The vital port comprises an output and input port circuited in a way so that a port check program can ascertain that the port can be used safely for vital signals. The vital port supplies the (−) side of energy to the selected relay by means of the VITAL− signal.

When the vital program in the main processor is satisfied, the main processor sends at least one vital checkword to the vital driver processor. The vital checkword commands the vital driver to supply the VITAL+ signal to the other side of the output relays to provide energy to the output relays for a specified time. The time, called the Relay Sustain Time, can be specified to be different for each code rate, if desired.

The vital driver clock supplies time signals to the main processor at a rate which provides approximately one percent resolution of period at the fastest rate in a code family. A 500 microsecond clock is used in this example. The main processor checks these time signals against its own clock crystal in a vital program segment which will cause the processor to fall into the IDLE state if the clocks do not agree.

The output of an incoming rate code signal is sensed by a flag input to the main processor. The main processor counts time pulses and identifies the incoming rate by comparing pulse counts to values in a table. This time measurement is done by two independent program segments using different registers, memory locations and table values. One measurement is made during the A phase of the code signal (ON followed by OFF) and the second measurement is made during the B phase (OFF followed by ON). The table values define the limits of each code rate period and excludes code periods that fall between expected rates beyond the acceptable tolerance.

If a received signal has an acceptable code rate, its duty cycle is checked. Since passive decoders tend to reject signals having ON and OFF times differing by more than 20 percent, the duty cycle check tests the signal to this limit. Any limits may be specified since they are table values and they may be specified differently for each code rate if desired. The duty cycle is checked by a subroutine which performs simple arithmetic on the measured ON and OFF times. This subroutine is cycle checked by running it with test values having magnitudes close to the values used for the code being received. During the A phase, the test proves that a duty cycle out-of-tolerance in one direction will be rejected while during the B phase, the test proves that a duty cycle out-of-tolerance in the other direction will be rejected. If rate or duty cycle is out-of-tolerance, the main processor takes no further action on the currently received code cycle. If the code cycle passes these tests, the main processor selects an output relay. It is vital that the proper relay be selected and no failure in hardware or software can be allowed to cause an improper relay to be energized. Software integrity is guaranteed by the use of diversity and cycle checks as described. The vital port is used in a hardware check.

The port test routine tests each bit in the vital port by sending a single bit to each latch, reading the port contents and verifying that only one latch is set and that it is the correct one.

While the main processor proceeds in making the various vital decisions and tests, it is building pointer checkwords whose inputs reflect the important events in the decoding, testing and relay section process. The pointer checkwords have two phases, the direct phase generated during the processing of the A phase of the code and the complement phase generated during the processing of the B phase of the code cycle. Each pointer checkword is sent to the vital driver processor as it is generated, replacing the previously received pointer checkword.

The vital driver uses the two phases of the checkword to address separate tables to obtain constants for a vital time program. The vital time program decrements constants in two separate registers and checks the decrementing process by comparing the current values of the constants to their previous values and to each other on each step. Any improper relation among these numbers causes the processor to fall into the IDLE state. The time program sets and resets an output flip-flop at a fixed rate as long as it is running. This rate is decoded in a tuned vital driver to generate a VITAL+ signal which energizes the relay selected by the main processor. Each checkword input provides VITAL(+) for a limited time. Valid checkwords must be generated continuously (with allowance for an occasional miss due to noise) in order to maintain an output relay energized.

With regard to the noise susceptability of the decoder of the invention, it is noted that the output of a digital decoder is dependent on the quality of the input signal. Excessive noise may cause the vital program to reject a code. Passive tuned decoders have an advantage over digital decoders since they are relatively narrow band pass filters, each one filtering its particular code out of the noise if, indeed, that code is present. The passive decoder is a uniquely vital filter because of its simple passive design and the vital threshold feature of its signal type output relay.

The signal presented to the decoder of the invention is filtered by the bandwidth limits of track and the carrier receiver which work to exclude components outside of the range of code rates used. However, noise in the pass band is not rejected so that digital decoders may require slightly higher signal levels than passive decoders under adverse noise conditions. In that vein, it may be desirable and even necessary in noisy environments to precede the vital rate decoder with active or passive filter circuits in order to improve the decoder error rate.

Obviously, numerous modifications and variations of the present invention are possible in light of the above teachings. For example, to the extent that the circuit detail shown in the Figures are dictated by the requirements of a particular microprocessor selection, these circuit details clearly can be easily modified by those skilled in the art to accommodate other microprocessor families having the minimum requirements necessary for performing the vital functions described above. It is therefore to be understood that within the scope of the appended claims, the invention may be practiced otherwise than as specifically described herein.

What is claimed as new and desired to be secured by Letters Patent of the United States is:

1. A vital rate decoder capable of actuating at least one output device in correspondence with the frequency or rate code of an input signal applied to the decoder, comprising:

decoding processor means coupled to the input signal for evaluating the rate code and duty cycle of the input signal, said decoding processor means comprising, rate decoding means for decoding the rate code and duty cycle of said input signal, means for producing plural checkwords indicative of decoder operation, said checkwords having predetermined values based on failure free decoding processor means evaluation of said input signal, and means for enabling actuation of said at least one output device based on the decoded rate code comprising means for applying a first device activation signal to one side of the output device corresponding to the decoded rate code of the input signal; and checking means coupled to said decoding processor means for receiving said checkwords therefrom, for verifying failure-free performance based on generation of valid checkwords and for only then generating a second device activation signal and applying said second device activation signal to said output device to actuate said output device only in the event of concurrent generation of said first activation signal.

2. A vital rate decoder according to claim 1, wherein said checkword producing means produces at least one new checkword for at least each cycle of input signal to replace a checkword produced from a previous cycle of input signal.

3. A vital rate decoder according to claim 1 wherein said checkword producing means produces at least one new checkword for at least each half cycle of input signal to replace a checkword produced from a previous half cycle of input signal.

4. A vital rate decoder according to claim 1 wherein said checking means comprises:

a vital timer processor having a pair of vital counting registers, memory means for storing said checkwords and an output program for loading predetermined bytes into said vital counting registers, and for controlling a subsequent decrementing of said vital counting registers, wherein said checkwords are used by said output program to select and load said bytes into said vital counting registers, said vital timer processor further having means for decrementing said vital counting registers after loading of said bytes, comparator means for verifying that the contents of said vital counting registers bear a predetermined relationship during decrementing thereof, and means for producing and applying to the other side of said output relays said second relay actuating signal for a predetermined time period upon verification that the contents of said vital counting registers maintain said predetermined relationship during decrementation thereof, said predetermined time period equaling the time taken until the decremented vital counting registers reach a predetermined state.

5. A vital rate decoder according to claim 1, further comprising:

said rate decoding means comprising, memory means for storing plural rate window words which correspond to time intervals occurring during respective codes, a level change detector for detecting the moment said input signal changes from a first level to a second level, or changes from said second level to said first level, a first rate counting register clocked by a clock source and preset by a first rate window word upon detection of an input signal level change from said first level to said second level, said first rate counting register decremented to a predetermined count and successively preset by successive rate window words upon being decremented to said predetermined count until the input signal again changes from said first level to said second level, means for forming a first remainder word based on the count of said first rate counting register when said input signal again changes from said first level to said second level and a first partial word based on the count of the first rate counting register when said input signal changes from said second level to said first level;

means for identifying the rate of the input signal based on the rate window word preset into said first rate counting register when the input signal successively changes from said first level to said second level, means for verifying that the duty cycle of the rate identified input signal falls within at least one predetermined limit based on the rate word window word preset into the first rate counting register upon rate identification, said first remainder word and said first partial word, and means for forming a first pointer checkword based on the rate of the input signal identified by said identifying means and a verification of the duty cycle by the duty cycle verifying means.

6. A vital rate decoder according to claim 5, further comprising:

said rate decoding means comprising, a second rate counting register clocked by said clock source and preset by a first rate window word upon detection of an input signal level change from said second level to said first level, said second rate counting register decremented to a predetermined count and successively preset by successive rate window words upon being decremented to said predetermined count until the input signal again changes from said second level to said first level, means for forming a second remainder word based on the count of said second rate counting register when said input signal again changes from said second level to said first level and a second partial word based on the count of the second rate counting register when said input signal changes from said first level to said second level, means for identifying the rate of the input signal based on the rate window word preset into said second rate counting register when the input signal successively changes from said second level to said first level, means for verifying that the duty cycle of the rate identified input signal falls within at least one predetermined limit based on the rate window word preset into the second rate counting register upon rate identification, said second remainder word and said second partial word, and means for forming a second pointer checkword based on the rate of the input signal identified by said identifying means and a verification of duty cycle by the duty cycle verifying means during decrementing of said second rate counting register.

7. A rate decoder according to claim 6, wherein said decoding processor means further comprises:

duty cycle test means for generating dummy test words outside said at least one predetermined duty cycle limit, and means for producing duty cycle test checkwords based on respective detections that said dummy test words falls outside said at least one predetermined duty cycle limit.

8. A rate decoder according to claim 7, further comprising:

a vital port coupled to said decoding means and comprising an output port having plural bits coupled to respective output relays;

said decoding processor means comprising means for applying a first logic level to at least one output relay coupled to the output port bit corresponding to the identified input signal rate while maintaining the remaining bits at a second logic level opposite the first logic level; and said checking means comprising, an input port coupled to a checking data bus, means for coupling said checking data bus to said vital port output port, and means for coupling checkwords produced by said decoding means to said checking means via said checking data bus.

9. A rate decoder according to claim 8, further comprising:

said memory means of said checking means comprising a delta table memory storing delta checkwords corresponding to respective of said first and second pointer checkwords, said delta table memory addressed by the vital port output port upon application by said output port of said first logic level to said output relay to provide respective delta checkwords, and said vital processor comprising means for adding each of said delta checkwords to respective pointer checkwords to form normalized pointer checkwords used to select said bytes loaded and decremented in said vital counting registers.

10. A vital rate decoder according to claim 9, further comprising:

said vital port further comprising an input port coupled to the vital port output port with a one bit shift;

said decoding processor means comprising, means for applying a true logic level to one bit of said vital port output port and a complementary logic level to the other bits of said output port, means for reading the true logic level at said vital port input port and recycling said true logic level to said vital port output port with a one bit shift, and means for counting the number of times said true logic level is shifted between the vital port input and output ports and for forming a port test checkword based thereon.

11. A vital rate decoder according to claim 10, further comprising:

said decoding processor means comprising a first clock applying first clock signals to a divider coupled to said first clock;

said checking means comprising a second clock and a divider clocked by said second clock and having an output coupled to the decoding means, wherein the checking means divider output occurs after a predetermined multiple of decoding processor means first clock are applied to said decoding processor means having memory locations for storing selected contents of the decoding processor means clock divider upon application of the checking means clock divider output thereto, and said decoding processor means comprising means for then resetting the decoding means clock divider, and means for forming a clock check checkword based on the stored decoding means clock divider output corresponding to the most recently applied checking means clock divider.

12. A vital rate decoder according to claim 11, wherein said clock source for clocking said first and second rate counting registers is derived from an output of the checking means clock divider clocked by said second clock.

13. A vital rate decoder according to claim 11, further comprising:

said decoding processor means producing said port test checkword, said clock check checkword, and said duty test cycle checkword at least after each production of either said first pointer checkword or said second pointer checkword;

said checking means comprising, means for retrieving checkwords from said memory means of said checking means during formation of the vital counter words, means for clearing the memory location of each checkword retrieved from said checking means memory means after retrieval therefrom, and means for verifying clearing of the memory locations of respective checkwords after clearing thereof.

14. A vital rate decoder according to claim 13, wherein said memory clearing verifying means comprises:

said checking means memory means storing plural dummy clear words, means for retrieving dummy clear words from said checking means memory means and for loading said dummy clear words into the memory locations storing selected of said checkwords in said checking means memory means, means for reading the stored dummy clear words stored and for forming a memory clear checkword based on the sum of the dummy words read from said checking means memory means.

15. A vital rate decoder according to claim 14, further comprising:

said memory means of said checking means comprising, a stacked pointer checkword memory formed of two level including a first level and a second level, and said checking means comprising, means for storing the most recently produced pointer checkword in said first level, means for storing the previously produced pointer checkword in said second level, means for comparing the pointer words stored in the first and second levels of the stacked pointer checkword memory, means for enabling loading and decrementing of said predetermined bytes into said vital counter registers only when the first and second levels contain identical pointer words, means for shifting the pointer word stored in the first level to the second level after the comparing of the pointer words, and means for altering the contents of said first level prior to production of a successive pointer checkword, and means for verifying altering of the contents of said first level.

16. A vital rate decoder according to claim 15, further comprising:

said vital timer processor comprising, comparison means for verifying that successively generated of said first and second pointer words correspond to the same input signal rate, and means for loading said vital counting registers with said predetermined bytes only when said first and second pointer words correspond to the same code rate.

17. A vital rate decoder according to claim 16, further comprising:

each output device comprising a relay, said memory means of said checking means storing instructions for loading and decrementing of said predetermined bytes, said instructions resulting in a program idle state if any of said port test, clock check, duty cycle test, normalized pointer and memory clear checkwords are invalid, said instructions otherwise resulting in the setting and resetting of a flip-flop to produce a vital output signal having a predetermined frequency, said checking means comprising, a tuned vital driver coupled to said vital output signal and tuned to the predetermined frequency thereof for producing said second device activation signal for application to one side of each of the output relays when said vital output signal having said predetermined frequency is present, the other side of each of the output relays being connected to the respective bits of the vital port output port with the relay corresponding to the rate code of the input signal having said first device activation signal applied to the other side thereof via the respective bit of said vital port output port.

18. A vital rate decoder according to claims 1, 2 or 3, further comprising:

each output device comprising a relay, a vital output port having plural bit outputs, each of which is coupled to a respective output relay, said rate decoding means applying said first device activation signal in the form of a VITAL− signal to one side of the output relay corresponding to the rate code of the input signal; and said checking means comprising, a vital timer processor having a pair of vital counting registers, a memory storing vital timer processor instructions for producing a vital output signal having a predetermined frequency, said instructions addressed by words based on said checkwords and controlling loading and decrementing of predetermined bytes also stored in said memory into said vital counter registers, said instructions entering an idle state if any of said checkwords are invalid and otherwise resulting in the setting and resetting of a flip-flop to produce said vital output signal having said predetermined frequency, and a tuned vital driver coupled to said vital output signal and tuned to the predetermined frequency thereof for producing said second device activation signal in the form of a VITAL+ signal for application to one side of each of the output relays when said output signal having said predetermined frequency is present, the other side of each of the output relays being connected to the respective bits of the output port of said vital output port for application of said VITAL− signal thereto.

* * * * *